United States Patent [19]

Demor, III et al.

[11] Patent Number: 4,926,918

[45] Date of Patent: May 22, 1990

[54] PNEUMATIC TIRE

[75] Inventors: Edward J. Demor, III, Copley; Walter W. Hinkel, Massillon; Lewis T. Lukich, Akron, all of Ohio

[73] Assignee: The Goodyear Tire & Rubber Company, Akron, Ohio

[21] Appl. No.: 313,192

[22] Filed: Feb. 21, 1989

[51] Int. Cl.$^5$ .............................................. B60C 13/02
[52] U.S. Cl. ...................................... 152/154; 152/523
[58] Field of Search ................................ 152/154, 523

[56] References Cited

U.S. PATENT DOCUMENTS

| D. 66,114 | 12/1924 | Dix . | |
|---|---|---|---|
| 1,581,590 | 4/1926 | Moore . | |
| 1,757,754 | 5/1930 | Waterfall . | |
| 3,204,681 | 9/1965 | Olagnier et al. | 152/154 |
| 3,400,745 | 9/1968 | Schwartz | 152/209 |
| 3,450,182 | 6/1969 | Verdier | 152/352 |
| 3,568,747 | 3/1971 | Fletcher | 152/154 |
| 3,982,579 | 9/1976 | Mirtain . | |
| 4,079,768 | 3/1978 | Verdier | 152/353 |
| 4,168,732 | 9/1979 | Monzini | 152/353 |
| 4,265,289 | 5/1981 | Pommier | 152/209 |
| 4,356,985 | 11/1982 | Yeager et al. | 244/103 |
| 4,732,199 | 3/1988 | Kajiwara | 152/557 |

FOREIGN PATENT DOCUMENTS

| 32107 | 4/1923 | Denmark | 152/154 |
|---|---|---|---|
| 10245 | 5/1909 | France | 152/154 |
| 566723 | of 1924 | France | 152/154 |
| 619476 | 4/1927 | France | 152/154 |
| 722116 | 3/1932 | France | 152/154 |
| 1266628 | 12/1961 | France | 152/154 |
| 2238603 | 2/1975 | France . | |
| 2419183 | 10/1979 | France . | |
| 63-170110 | 7/1988 | Japan | 152/523 |
| 6227 | of 1909 | United Kingdom | 152/154 |
| 20837 | of 1912 | United Kingdom | 152/154 |
| 0178130 | 2/1923 | United Kingdom | 152/154 |
| 0241912 | 1/1926 | United Kingdom | 152/154 |
| 1110105 | 4/1968 | United Kingdom . | |
| 1226325 | 3/1971 | United Kingdom . | |
| 1359416 | 7/1974 | United Kingdom . | |

Primary Examiner—Raymond Hoch
Attorney, Agent, or Firm—R. J. Slattery, III

[57] ABSTRACT

A pneumatic tire having a chine extending outwardly from at least one sidewall. The average thickness of the chine, between a point 50% of the width of the chine from the tire sidewall and the end of the chine, is at least 50% of the width of the chine.

4 Claims, 2 Drawing Sheets

PNEUMATIC TIRE

BACKGROUND OF INVENTION

1. Field of Invention

The present invention relates generally to pneumatic tires and more specifically to aircraft tires, and even more specifically to aircraft tires with chines.

2. Description of the Related Art

Pneumatic aircraft tires not only support the weight of aircraft on the ground but also can affect an aircraft's performance during takeoffs and landings. Often an aircraft must land or takeoff on a runway that is covered with puddles of water. Because the aircraft's performance may be affected by splash generated by the tires, it is desirable that any splash generated by the tire on the runway surface be directed away from the aircraft.

Tire designers have long been aware of the advantages of directing splash from automotive and aircraft tires. For example, French Patent Nos. 566,723 and 722,116 and Danish Patent No. 32,107 disclose automobile tires with splash guards In the aircraft tire field, U.S. Pat. No. 3,204,681 to Olagnier et al. and U.S. Pat. No. 4,356,985 to Yeager et al. disclose aircraft tires featuring chines in the sidewall designed to deflect splash outwardly and away from the aircraft. Olagnier et al. discloses a generally triangular shaped chine whose width is between 1/20 and 1/6 of the tire's section width. Yeager et al. discloses a tire with a chine on each sidewall of the tire and a tread pattern designed to move water from the footprint to the chine.

In the past, on some aircraft and under some conditions, the chines of the prior art proved to be too flexible and deformed while directing the water splash.

SUMMARY OF THE INVENTION

In a tire according to the present invention, a chine extends generally axially from the tire's sidewall. The average thickness of the chine, between a point 50% of the width of the chine from the sidewall and the end of the chine, is at least 50% of the width of the chine.

BRIEF DESCRIPTION OF THE DRAWINGS

Other aspects of the invention will become apparent from the following description when read in conjunction with the accompanying drawings wherein.

DESCRIPTION OF THE PREFERRED EMBODIMENT

Figure 1:
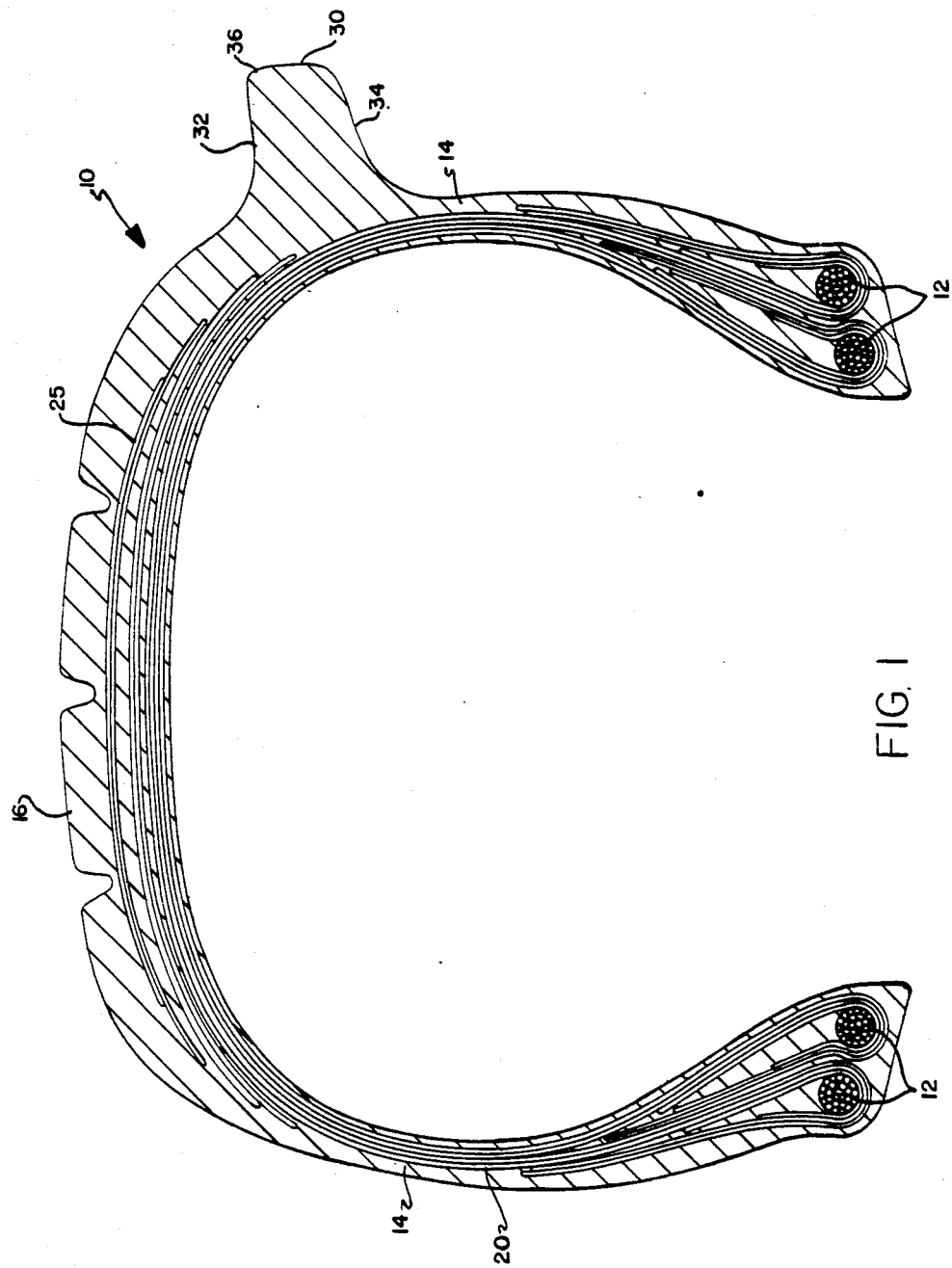
FIG. 1 is a radial cross-sectional view of a tire according to the present invention.

In the drawings, the same numerals are used for the same components or items in the several views. With particular reference now to FIG. 1, there is illustrated a pneumatic tire 10 designed for aircraft and featuring a chine according to the present invention.

The tire 10 has at least one pair of axially spaced apart annular tensile members 12. The annular tensile members are shown as wire filaments arranged in a circular cross-section but this is not believed to be essential to the invention and the annular tensile members could have been hexagonal or other well known cross-sectional shapes or be manufactured of cables or other materials. A pair of sidewalls 14 extend radially outwardly from the beads to a tread 16 which extends circumferentially of the tire. The term "radially" means directions radially toward or away from the tire's axis of rotation. The term "axially" means the direction parallel to the tire's axis of rotation.

The tire 10 may be reinforced in any manner consistent with good engineering practice, such as with a radial or bias carcass ply structure 20 extending between the annular tensile members 12. In the currently preferred embodiment, the tire is reinforced with a bias carcass ply structure. The tire may also have a tread reinforcing structure 25 between the carcass ply structure and the tread 16.

A chine 30 of elastomeric material integrally molded to a sidewall 14 of the tire extends generally axially outwardly from one or both of the sidewalls of the tire. "Chine" means a rubber projection extending generally axially outwardly from a sidewall of a tire. A chine may be reinforced although it generally is not. A chine is designed to direct the splash generated by the tire passing through water or other liquids.

While the invention may be practiced in the form of a new tire, it may also be practiced in the form of a chine manufactured for retreading purposes. In a new tire application, the chine is attached to the sidewall of a tire casing that has not been vulcanized. The tire casing and chine are vulcanized together in a mold, creating a new tire. A tire casing is the carcass, belt structure, beads, sidewalls, and all other components of the tire excepting the tread and undertread. The casing may be new, unvulcanized rubber or previously vulcanized rubber to be fitted with a new chine and/or tread.

In a retreading application, the chine can be "pre-cured", that is, vulcanized prior to being bonded to the casing being retreaded. Alternatively, the chine can be formed and bonded to the casing in a single "mold-cure" retreading operation.

Each chine has a radially outer first surface 32 which extends generally parallel to the axis of rotation of the tire. It is this first surface which directs the splash away from the aircraft. Each chine also has a radially inner second surface 34.

The chine should be located on the sidewall far enough from the tread 16 so that the chine will not contribute to the development of water spray by coming into contact with water on a runway. In the preferred embodiment, the radially outermost portion of the tread is approximately three centimeters farther from the tire's axis of rotation than the radially outer surface 32 of the chine.

Figure 2:
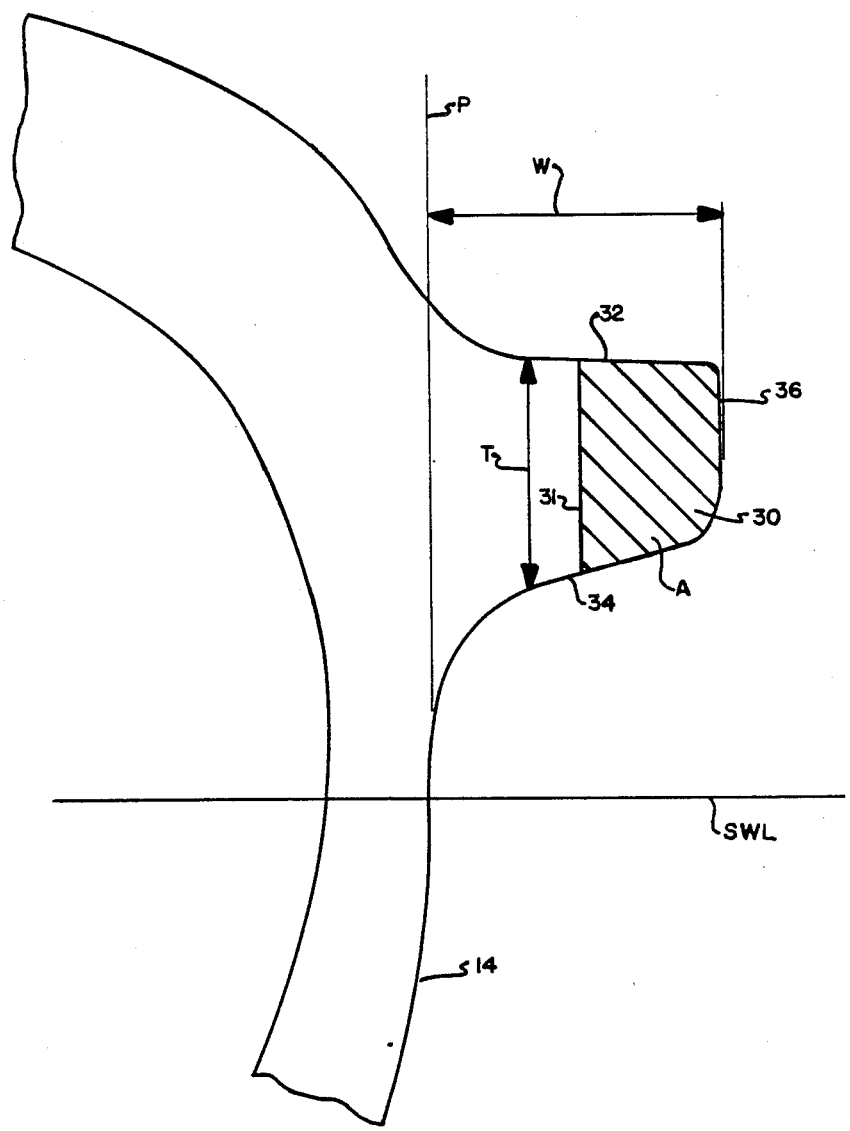
FIG. 2 is an enlarged cross-sectional view of a tire according to the present invention.

The inventors have found quite unexpectedly that prior-art chines, under some circumstances, are too flexible and deform under the force of the water spray. The current invention features a stronger, more rigid design. This is accomplished by decreasing the width of the chine and increasing its thickness. For purposes of this invention, the width of a chine is measured in a direction parallel to the axis of rotation of the tire while the thickness of the chine is measured in a radial direction. Referring to FIG. 2, the width of the chine is designated W and the thickness at a point along the width is designated T. The width of the chine is the axial distance between its axially outer edge, or end 36, and a plane P that is parallel to the equatorial plane of the tire and is tangent to the sidewall at the point of maximum axial width, or section width, as shown in FIG. 2.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration, protective bands, or chines. "Section Width Line (SWL)" means a line parallel in the cross-section of the tire to its axis of rotation and which is located at the tire's point of maximum axial width, i.e., at the location at which the tire's section width is measured. The point of maximum axial width is determined without reference to the chine.

In FIG. 2, the line designated 31 represents the edge of a plane parallel to the equatorial plane and to plane P. The line 31 is located at a point 50% of the width of the chine from the sidewall. The portion of the chine located between the end 36 of the chine and the point located 50% of the width of the chine from the sidewall has an average thickness equal to at least 50% of the width of the chine. "Average thickness" of the chine is calculated by dividing the radial cross-sectional area of the liquid deflecting means, over the width in question, by such width. For example, the area of the chine located between the end of the chine and the point 31 located 50% of the width of the chine from the sidewall is designated A. The average thickness of this area of the chine is equal to 2A/W. In the preferred embodiment, the portion of the chine located between the end of the chine and the point located 50% of the width of the chine from the sidewall has an average thickness equal to 62% of the width of the chine.

The contour of the chine can be determined by specifying the thickness at various points along the width. The thickness measured at a point 50% of the width of the chine from the sidewall is at least 66% of the width of the chine. The thickness at the point 75% of the width of the chine from the sidewall is at least 40% of the width of the chine. The thickness measured at the end of the chine is at least 30% of the width of the chine. Over at least 95% of its width, the chine has a thickness at least 30% of its width.

In the preferred embodiment the thickness at a point 50% of the width of the chine from the sidewall is equal to 70% of the width of the chine and at the point 75% of the width of the chine from the sidewall, the thickness of the chine is 63% of the width of the chine. At each point along the width of the chine, the thickness is at least 30% of the width of the chine. In the preferred embodiment, the point of minimum thickness is at the end 36 of the chine, where the thickness is 39% of the width.

The end 36 of the chine has a flat surface oriented generally parallel to the equatorial plane of the tire. The thickness of this flat surface is between 30% and 50% of the width of the chine. In the preferred embodiment, the thickness of the flat planar surface is 39% of the width of the chine.

Pneumatic tires, including those according to the preferred embodiment of the invention, are generally manufactured through a molding process. Because it is difficult to mold an article with sharp corners, molded articles typically feature edges that are slightly rounded. In the preferred embodiment, the edges of the chine have been rounded, with each rounding radius less than 7 mm.

What is claimed is:

1. A pneumatic tire having sidewalls, comprising: a chine extending generally axially from a sidewall, the chine having a width and a thickness, the average thickness of the chine between a point located at 50% of the width of the chine from the sidewall and the end of the chine being at least 50% of the width of the chine and wherein the thickness measured at a point located at 50% of the width of the chine from the sidewall is at least 66% of the width of the chine.

2. A pneumatic aircraft tire as in claim 1 wherein the thickness measured at a point 75% of the width of the chine from the sidewall is at least 40% of the width of the chine.

3. A pneumatic aircraft tire as in claim 2, the thickness measured at the end of the chine is at least 30% of the width of the chine.

4. A pneumatic aircraft tire as in claim 3 wherein the end of the chine is a flat surface oriented generally parallel to the equatorial plane of the tire and having a thickness between 30% and 50% of the width of the chine.

* * * * *